US006576175B1

(12) United States Patent
Roos

(10) Patent No.: US 6,576,175 B1
(45) Date of Patent: Jun. 10, 2003

(54) METHOD OF TEMPERING COMPOSITE BOARD PANELS WITHOUT USE OF A BAKE OVEN

(75) Inventor: Kenneth D. Roos, Nicollet, MN (US)

(73) Assignee: Archer-Daniels-Midland Company, Decatur, IL (US)

( * ) Notice: Subject to any disclaimer, the term of this patent is extended or adjusted under 35 U.S.C. 154(b) by 184 days.

(21) Appl. No.: 09/827,067

(22) Filed: Apr. 5, 2001

Related U.S. Application Data

(60) Provisional application No. 60/195,089, filed on Apr. 6, 2000.

(51) Int. Cl.[7] .......................... B29B 11/12; B29C 71/00

(52) U.S. Cl. ....................... 264/109; 264/129; 264/232; 264/234; 264/235; 264/237; 264/346

(58) Field of Search ................................ 264/109–128, 264/340–348, 129, 232, 234, 235, 337

(56) References Cited

U.S. PATENT DOCUMENTS

| | | | | | |
|---|---|---|---|---|---|
| 3,681,487 A | * | 8/1972 | Shaines | 264/109 |
| 5,593,625 A | | 1/1997 | Riebel et al. | 264/115 |
| 5,607,633 A | | 3/1997 | Sleeter et al. | 264/115 |
| 5,635,123 A | | 6/1997 | Riebel et al. | 264/125 |
| 5,719,301 A | | 2/1998 | Sleeter | 554/24 |
| 5,942,058 A | | 8/1999 | Sleeter et al. | 156/62.2 |
| 6,001,286 A | | 12/1999 | Sleeter | 264/13 |
| 6,277,310 B1 | | 8/2001 | Sleeter | 264/13 |
| 6,364,982 B1 | * | 4/2002 | Lynch et al. | 122/291 |
| 6,451,384 B1 | * | 9/2002 | Burrows et al. | 427/393 |
| 2002/0103091 A1 | * | 8/2002 | Kodali | 508/485 |

FOREIGN PATENT DOCUMENTS

WO WO 00/25998 5/2000

* cited by examiner

*Primary Examiner*—Stephen J. Lechert, Jr.
(74) *Attorney, Agent, or Firm*—Sterne, Kessler, Goldstein & Fox P.L.L.C.

(57) ABSTRACT

A method of tempering composite fiber panels eliminates a need for a bake oven during the tempering step. Both the front and back surfaces of the panels are sprayed with a tempering oil including a mixture of a drying oil and a dryer or catalyst. The drying oil may include a linseed oil refined to minimize low molecular weight and a conjugated oil. Sometimes the drying oil is further mixed with either a conjugated oil, a catalyst, a low molecular weight isocyanate resin (lmw-MDI) or another additive. The sprayed panels are stacked preferably in face-to-face contact inside a curing chamber heated only by the residual heat in the hot panels. A number of additives to the tempering oil are considered. A number of different forms of commercial panels are considered, such as: hardboard, oriented strandboard, fiber board siding, wafer board, medium density fiber board, particle board, and other similar boards.

28 Claims, No Drawings

METHOD OF TEMPERING COMPOSITE BOARD PANELS WITHOUT USE OF A BAKE OVEN

This is a formal patent application replacing provisional application Ser. No. 60/195,089, filed Apr. 6, 2000.

FIELD OF THE INVENTION

This invention relates to means for and methods of tempering composite fiber panels without requiring a bake oven for the tempering process.

BACKGROUND OF THE INVENTION

As used herein, the term "dryer" is interchangeable with the term "catalyst." The term dryer is an historic word for a catalyst used with industrial agricultural oils in the paint and coating industry. The dryers are actually added to these oils in order to catalyze the oxidation reaction thereof. The three main types of catalyst used with this invention are:

1. Many metal dryers commonly used in he oil based paint and coating industry, some of which are manganese, iron, cobalt, zirconium, calcium, and rare earth.

2. Resins and modified resins, some of which include low molecular MDI (isocyanate resin) phenolformaydehyde resin, and ureaformaldehyde resins. Also, some of these resins are available in blended form, such as the ESL, Kelvin, Drisoy, and Beckosol materials.

3. Organic peroxide materials are various peroxides carried in a solvent carrier, which actually add oxygen to the oil and, hence, a rapidly progressing oxidation reaction. The most common peroxide used in MEKP, methyl ethyl ketone peroxide.

Composite panels are usually made of wood, agriculture or other fibers by a manufacturing process leading to a production of panels in the form of hardboard, oriented strand board, fiber board siding, wafer board, medium density fiber board, particle board, and other similar boards. Wood is the preferred fiber. The panels or boards are made by mixing fiber and a binder and then placing the mixture in a hot press.

Wood-fiber based composites are sensitive to moisture, particularly moisture in a liquid form. In addition to linear expansion and thickness swell, moisture can cause blistering and fiber-pop at the panel surface. Since fiberboard is often painted or coated, especially for decorative use, blistering and fiber-pop become important issues, especially when using water based topcoats or adhesives. Tempering also provides a strong surface layer that gives added strength, especially to doorskins used in the manufacturing of doors.

During building construction or transport of the finished composite, structural panels are often exposed to weather elements before they are protected by a siding or roofing. Severe weather can cause water damage to unprotected panels in a very short period of time. To protect the paneling during the construction process, a tempering topcoat can be applied to the panel's surfaces to provide them with a hard, moisture resistant surface.

Usually, the process of manufacturing these composite panels includes a use of a tempering oil which is applied to the surfaces of the panel in order to impart a smooth, strong, and water resistant surface thereto. However, to date, the manufacturing technology has required a high temperature bake oven in order to cure the tempering oil after it has been applied to the surface of the panel.

In the following description, reference is made to a number of tempering oil additives which may be further identified in the following manner. "Alinco" is a term of art which is well known in the oil industry. A letter after "Alinco" indicates the viscosity of the oil. "Archer 1" is a trademark and "GP1125", "Scientific Double Boiled Linseed Oil" and "ML189" are the manufacturer's product codes of the Archer Daniels Midland Company of Decatur, Ill. "Beckosol", "Dressy", "Esskol", "Kellin", and "Kelsol" are product lines of the Richol Corporation. "Mondur" is a product of the Bayer Corporation. The letters or numbers following these names are the manufacturer's product codes. The value "p" refers to the results of a statistical analysis of at least two blends. When "$p<0.5$", it means that there is a statistically significant difference between the two blends without reference to whether the difference is good or bad.

Reference is made to U.S. Pat. Nos. 5,607,633 and 5,719,304 which describe systems for bonding wood or other agriculture based fibers in order to form composite panels. These patents provide a binder made from drying oils having more than one carbon-to-carbon double bond, usually separated by a methylene blend, commonly described as "methyline interrupted". These patents teach a shifting or relocation of the methylene blend in order to remove the interruption and, thereby, produce a conjugated oil. Then, the drying oil is mixed with a bonding agent. This form of conjugated drying oil is sold under the trademark "Archer 1" by the Archer Daniels Midland Company of Decatur, Ill.

Other examples of tempering oils are linseed oil, soy bean oil, canola oil, sunflower oil, tung oil or mixtures thereof. Also, other materials, such as metal catalysts (manganese, cobalt, iron, zirconium, rare earth, etc.), organic catalysts (such as organic peroxides), phenolic resins, isocyanate resins, ureaformaldehyde resins, and melamine resins can be added to the tempering oils to produce different effects, as desired. The manufacturer describes two of the preferred oils in the following manner.

| PRODUCT IDENTIFICATION | |
|---|---|
| Product Name | GP 1125 Linseed Oil |
| Product Class: | Refined Linseed Oils |
| Description: | An alkali refined linseed oil |
| Product Name: | Scientific Double Boiled Linseed Oil |
| Product Class: | Raw and Boiled Oils |
| Description: | A raw linseed oil containing manganese and cobalt dryers |

| PHYSICAL AND CHEMICAL DATA FOR BOTH GP1125 AND SCIENTIFIC DOUBLE BOILED LINSEED OILS | |
|---|---|
| Boiling point: | N/A |
| Volatile: | 0 by volume |
| Evaporation rate: | Nonvolatile |
| Appearance: | clear amber liquid |
| Vapor Density: | Nonvolatile |
| Specific gravity: | 0.93 @ 25 C |
| Viscosity: | A |
| Solubility in water: | Negligible |
| Stability: | Stable |

| | SPECIFICATIONS G-P1125 |
|---|---|
| Acid Value | 0.5 max. |
| Color (Gardner 1953) | 11 |
| Iodine Value | 175–190 |
| Saponification Value | 189–195 |

-continued

| | |
|---|---|
| Pounds per Gallon - Av. | 7.71 |
| ADM Code Number | 001–102 |

DRYER EVALUATION

| PRODUCT | DRY TIME |
|---|---|
| Raw linseed oil/GP1125 | 96 hours |
| Raw linseed oil/GP1125 | |
| 0.50% of 12 iron solution | 72 hours |
| 0.50% of 12% manganese solution | 11 hours |
| 0.50% of 12% cobalt solution | 6 hours |
| AST tempering oil | |
| 0.50% of 12% iron solution | 50 hours |
| 0.50% of 12% manganese solution | 6 hours |
| 0.50% of 12% cobalt solution | 4 hours |
| Archer I | 24–36 hours |
| Archer I | |
| 0.25% of 12% manganese solution | 10–14 hours |
| 0.50% of 12% manganese solution | 9 hours |
| 0.75% of 12% manganese solution | 6–7 hours |
| 1.00% of 12% manganese solution | 6–7 hours |
| 0.25% of 12% cobalt solution | 4 hours |
| 0.50% of 12% cobalt solution | 2 Hours |

The Manganese ("Mn") dryer used with the various oils had 40% wt. solids and was supplied by the OMG Chemicals Company, which uses the product code FOA #910 for identification purposes. The percentage of the added Mn dryer was based on the liquid weight of the drying oil that was used.

Heretofore, the tempering drying oils have usually been baked on the panel in a high temperature oven, which may produce a Hazardous Air Pollutant ("HAP") or a concentration of Volatile Organic Compounds ("VOC"), both of which may become a serious pollutant. As a result, governmental regulations (e.g., the EPA Clean Air Act) severely limit the release of VOC's, HAP's, and other pollutants. Other problems caused by VOC's and HAP's are found, especially in hot press areas and bake oven areas. For example, the VOC fumes may lead to fire hazards, especially in exhaust flues and stacks.

Still another problem in the production of composite panels is the very high cost resulting from the energy consumption required to heat the bake ovens. These costs tend to be increased sharply by such things as weather conditions, political instability in countries where fuel is produced, and other unpredictable events.

Accordingly, to provide stable manufacturing costs and practices, a cleaner environment and the like, a desirable advance in the art results from an elimination of bake ovens in the panel tempering process.

BRIEF DESCRIPTION OF THE INVENTION

Therefore, in keeping with an aspect of the invention, a mixture of a tempering oil in combination either with a catalyst dryer or a low molecular weight isocyanate resin, or other resins with a fast curing characteristic and with a minimal amount of hazardous emissions, is sprayed on one or both surfaces of a composite panel. After the composite panels are sprayed, they are stacked inside a curing chamber or on a pile for a period of time required to cure the oil. The duration of the time period depends, at least in part, on whether the oil is sprayed on the panel while it is still hot, for example, immediately after it is out of the press which formed it, or whether it is sprayed after the panel has been sanded. After an optimal and prescribed period of time, the panels are removed from the curing chamber and found to have a tempered surface which at least equals or exceeds the properties of temperatured surfaces produced by most prior methods that utilized a bake oven.

DETAILED DESCRIPTION OF THE INVENTION

More particularly, an evaluation of the inventive process began with a study of various linseed oil based tempering agents, as follows:

| Blend | Description |
|---|---|
| (i) | GP1125 linseed oil with 0.15% wt. manganese (Mn) dryer |
| (ii) | A mixture of 70% GP1125 linseed oil and 30% "Archer 1" conjugated drying oil with 0.15% wt. Mn dryer |
| (iii) | GP1125 with 5.0% wt. low molecular weight isocyanate resin (lmw-MDI) |

The GP1125 linseed oil was selected as a base because it is refined to minimize low molecular weight compounds which tend to flash off at high temperatures.

Tempered composite panels are submitted to the following tests in order to evaluate their quality and other desirable characteristics.

A cobb-ring test is carried out by gluing a ring on a surface of the tempered composite panel. Then, the panel is carefully weighed with the ring in place. Next, a prescribed amount of water is placed in the ring and the panel is left with the water standing in the ring for a prescribed period of time, for example. Often, cobb-ring tests are carried out by using a 2-inch diameter ring with 55 grams of water setting in the ring during a 24-hour period. Then, the water is poured off and the panel is again weighed. The difference in weight between the two weighings is an indication of how much water has penetrated the tempered surface and is absorbed into the panel. Usually, the test result is expressed as a percentage of the dry weight which has been added to the panel and which appears after the test.

A tape-pull test is carried out by first placing and pressing an adhesive tape on the tempered surface of the panel. Thereafter, the tape is ripped off the surface. Next, the adhesive surface of the tape is inspected to determine how much fiber has been ripped from the surface of the tempered panel.

A cleavage test is provided by a block that is glued to the face of the panel having the tempering oil coating thereon. After the glue has fully set, the block is put into a clamp and the panel is ripped off the block. The amount of force required to rip the panel off the block is an indication of the rupture strength of the tempered panel.

EXAMPLE 1

The "Archer 1" drying oil was selected because it is refined for a higher rate of conjugation which gives a faster cure and a tougher film. This is the drying oil described in U.S. Pat. Nos. 5,607,633 and 5,719,304.

The composite panels used in the evaluation were 12"×4" samples of doorskin supplied by Masonite from its Towanda, Pa. mill. The term "doorskin" is a well-known term of art used to describe large hardboard panels which are secured to opposite sides of a frame in order to make a door.

The testing began with a tempering technique that involved weighing the individual untreated doorskin panels and then heating them to about 380° F. (193° C.) in order to emulate the temperature of panels at the time when they are removed from the press that made them. More particularly, immediately after being removed from the simulated hot press, the tempering oil was applied to both sides of the panels by using a hand held airless sprayer. Oil was applied at a loading of about 1.5 grams/ft$^2$ on the front surface of the panel and 4.5 grams/ft$^2$ on the back surface of the panel. The weight of the untreated panels was compared to the weight of the sprayed panel to determine the loading of the oil. The spray-coated panels were then hot-stacked and stored in a cure chamber at an ambient temperature of about 70° F. (21° C.) for about 10 to 24 hours before being cut into test samples. If the plant has a bake oven which was used in the former tempering process, it provides a good cure chamber because it is insulated, has air circulation, etc. For the inventive method, the heat in the cure chamber is only the residual heat derived from the hot panels, whereby the cure chamber is, in effect, a heat sink.

Up to an additional 24-hours may be provided before administering cobb-ring, tape-pull, and cleavage tests.

The tempered panels were evaluated for surface integrity by a tape-pull test, for water absorption by a cobb-ring test, and for rupture strength by a cleavage test. Six tape-pulls and twelve cobb-ring tests were conducted for each tempering oil combination. The tempered panels were also evaluated in a cleavage test in order to determine their ability to bond to door framing materials. Conventional "Masonite" mill tempered control panels were also subjected to the same test cycle in order to provide control data for a comparison analysis.

The inventive composite panels tempered with the inventive oils yielded front surface tape-pull results that are similar to the same test results on the mill tempered control panels. The tape-pulls from the back surface of the inventive oil tempered panels had a little more fiber pulled from the surface than the control panels had. However, the differences between the back surface tape-pull on both panels with the inventive tempering oils and the control panels were slight. Therefore, both the front and the back panel results are considered to be well within the acceptable range.

Cobb-ring test showed that the GP1125. and Imw-MDI (Blend (iii)) tempered panels had the lowest water absorption. Cobb-ring test results from both the GP1125-Mn panels (Blend (i)) and the GP1125/Archer 1 (Blend (ii)) panels exhibited water resistance properties which were similar to the water resistance properties of the mill tempered control panels. Again, any differences in these cobb-ring tests were well within the normal range.

The cleavage test resulting from the mill tempered control panel exhibited greater strengths than any of the three experimental combinations (Blends (i), (ii), and (iii)). The cleavage strengths of the experimental Blends were 11 to 16 pounds lower than the cleavage strengths of the control panels. The experimental panels from the Blend (iii) (GP1125 Imw-MDI) panels exhibited a higher incidence of failure at the glueline between the block and panel than did either of the other experimental panels or the control panels.

Conclusion

The experimental tempering oil combination exhibited satisfactory tape-pull test results. Cobb-ring tests indicated that water resistance properties of the inventive panels were either similar to or better than the mill tempered control doorskin panels. The cleavage strength of the experimental Blends of panels was not as great as the cleavage strengths obtained form the mill tempered doorskin control panels.

During initial experiments, each of the experimental tempering oils was applied at a loading of 6 grams/ft$^2$ to both the front and back surfaces of the doorskin control panels. At the higher loading, the tape-pulls were similar to the mill tempered control panels samples and the water resistance was superior. The cleavage strength of tempered doorskin panels with the experimental non-bake oils would most likely improve with an increased loading of the oil.

TABLE 1

Water absorption through tempered doorskin surface obtained by 2-inch cobb-ring test method. The three experimental tempering oil combinations are ranked from the lowest to the highest water absorption.

| Tempering Oil | | | | Absorption | |
|---|---|---|---|---|---|
| Blend | | Density (pcf) | | grams | percent |
| | Mill Tempered (control) | mean | 64.8 | 1.3 | 4.2 |
| | | s.d. | 1.0 | 0.1 | 0.4 |
| (iii) | GP1125 with 5.0% Imw-MDI | mean | 64.2 | 1.2 | 3.8 |
| | | s.d. | 2.0 | 0.2 | 0.7 |
| (i) | GP1125 with 0.15% Mn | mean | 65.0 | 1.4 | 4.5 |
| | | s.d. | 0.9 | 0.2 | 0.6 |
| (ii) | 70/30 gp1125/Archer 1 with 0.15% Mn | mean | 64.8 | 1.5 | 4.9 |
| | | s.d. | 1.8 | 0.1 | 0.5 |

Note:
pcf - pounds per cubic foot
s.d. - standard deviation
Mn - Manganese
Imw-MDI - low molecular weight isocyanate resin

TABLE 2

Tempered doorskin to door frame glueability obtained by cleavage test method. Cleavage test results are ranked from the highest to the lowest strength.

| Tempering Oil | | | | Cleavage |
|---|---|---|---|---|
| Blend | | Density (pcf) | | (pounds) |
| | Mill Tempered | mean | 69.1 | 59.0 |
| | | s.d. | 0.7 | 6.8 |
| (ii) | 70/30 GP1125/Archer 1 with 0.15% Mn | mean | 65.4 | 47.6 |
| | | s.d. | 0.9 | 7.5 |
| (i) | GP1125 with 0.15% Mn | mean | 65.3 | 44.3 |
| | | s.d. | 1.2 | 6.9 |
| (iii) | GP1125 with 5.0% Imw-MDI | mean | 67.4 | 43.1 |
| | | s.d. | 3.2 | 5.8 |

Note:
pcf - pounds per cubic foot
s.d. - standard deviation
Mn - Manganese
Imw-MDI - low molecular weight isocyanate resin

EXAMPLE 2

This example evaluates and compares a commercially available water seal with scientific double boiled linseed oil, with both the seal and oil used as a tempering topcoating on orientated strandboard ("OSB"). The commercial water seal is a water repellent comprised of wax emulsified in mineral spirits. The scientific double boiled oil is a 100% solids and low VOC emitting linseed oil formulation with a catalyst incorporated to speed drying. For both of these topcoating agents, two loadings were evaluated, at 3.5 grams/ft$^2$ and 5.0 grams/ft$^2$.

Methods and Materials

A number of OSB panels that were produced within the same shift were obtained directly from a manufacturer. The OSB panels were 7⁄16 inches thick. When the tempering oils were applied, the temperature of the OSB was approximately 70° F.

Each of the topcoating agents was applied to the surface of the OSB by using a hand held airless sprayer. To ensure the correct seal and tempering oil application rate, a 2-foot by 2-foot panel was placed on a scale, weighed, then sprayed with the topcoat, and thereafter weighed again. After topcoating, the panels were allowed to dry for 24-hours and then cut into 8×8-inch squares for cobb-ring testing to evaluate the water resistance at a panel's surface.

An additional 48-hours was allowed for drying both the topcoatings and caulking used to adhere the cobb-ring to the OSB. Hence, a total time of approximately 96-hours was allowed for the topcoats to dry before cobb-ring testing was conducted.

A total of five panel sets were evaluated by the cobb-ring test, as follows:

Control panel—OSB without a topcoat

A panel coated with commercial water seal @ 3.5 grams/$ft^2$

A panel coated with commercial water seal @ 5.0 grams/$ft^2$

A panel coated with scientific double boiled @ 3.5 grams/$ft^2$

A panel coated with scientific double boiled @ 5.0 grams/ft.

Results and Discussion

After the cobb-ring testing, the surfaces of the control samples had absorbed an average of 15.2% of their weight in water based on the initial dry panel weight. At the 3.5 grams/ft loading, the commercial water seal panel had an average cobb-ring water absorption value of 11.3% of its dry weight. The panel coated with the scientific double boiled oil had a water absorption of 9.9% if its dry weight.

When the topcoat loading was increased to 5.0 grams/$ft^2$ the mean cobb-ring value of the commercial water seal indicated a water absorption of 9.8% of its dry weight. The scientific double boiled at 5.0 grams/$ft^2$ loading had a mean cobb-ring value of 9.4% water absorption.

TABLE 3

Commercial Water Seal and Scientific Double Boiled Linseed topcoating oil evaluation for water resistance at OSB panel surface by cobb-ring test.

| | | Density (pcf) | Absorption (grams) | Absorption (%) |
|---|---|---|---|---|
| Control - no topcoat | mean | 37.4 | 80.9 | 15.2 |
| | s.d. | 1.6 | 10.0 | 2.7 |
| Commercial Water | mean | 40.7 | 62.3 | 11.3 |
| Seal 3.5 g/$ft^2$ | s.d. | 2.8 | 5.1 | 0.9 |
| Commercial Water | mean | 39.3 | 55.7 | 9.8 |
| Seal 5.0 g/$ft^2$ | s.d | 2.3 | 7.3 | 1.3 |
| Scientific Double | mean | 40.9 | 56.8 | 9.9 |
| Boiled 3.5 g/$ft^2$ | s.d. | 3.0 | 3.0 | 1.5 |
| Scientific Double | mean | 38.4 | 51.3 | 9.4 |
| Boiled 5.0 g/$ft^2$ | s.d. | 2.3 | 2.3 | 2.6 |

NOTE:
pcf - pounds per cubic foot
s.d. - standard deviation

Conclusion

At a loading of 3.5 grams/$ft^2$, both topcoats improved the OSB's surface water resistance. However, the panel with scientific double boiled linseed oil had 1.4% less water intake when compared to the panel with the commercial water seal.

An increased topcoating application of 5.0 grams/$ft^2$ improved the commercial water seal water resistance to a value which is comparable to that of the scientific double boiled linseed oil at the lower loading. The scientific double boiled linseed oil had a slight improvement, at the increased 0.4% loading.

For optimal surface water resistance, the scientific double boiled linseed oil should be utilized at a 3.5–5.0 grams/$ft^2$ application. The application of the commercial water seal would have to be increased by a factor of 43% in order to obtain results similar to that of the scientific double boiled linseed oil. Using the scientific double boiled linseed oil reduces material usage; therefore, less application time is required. More importantly, there is a significant cost savings. Additionally, the scientific double boiled linseed oil contains virtually no VOCs, has a shorter dry time, and an improved flake adhesion at the OSB surfaces.

The scientific double boiled linseed oil has no material which volatilizes into the atmosphere. This is in contrast to the commercial water seal, which contains as much as 5 lbs. of VOC per gallon. Moreover, with an incorporation of a catalyst, the drying time of the scientific double boiled linseed oil is reduced to a maximum of 8-hours, as compared to the 48-hours required for the commercial water seal. Since the scientific double boiled topcoat is linseed oil based and since linseed oil is a drying oil that is used as a binder in the composite panel, such as fiberboard and traditional linoleum, an application of the scientific double boiled oil topcoat helps to adhere the surface flakes on an OSB and to minimize surface peeling caused by abrasion. Field tests on such topcoated panels shows excellent surface integrity of the OSB flakes after extended periods of outdoor exposure.

EXAMPLE 3

Tempering hardboard is common practice, but to date little work has been done with tempering of medium density fiberboard ("MDF"). The inventive work on tempering MDF has centered on a use of two linseed based oils that are suitable as MDF tempering agents. Also, a consideration of the MDF manufacturing process is taken into account so that tempering can be implemented in a mill setting and with a minimal alteration to the existing production processes.

Methods and Materials

Two tempering oils (scientific double boiled linseed oil and GP1125-Mn (Blend (i)) were evaluated as non-bake tempering agents for application to MDF. The GP1125 oil was catalyzed with 0.15% of a 40% solids formulation Manganese (Mn) dryer. These tempering oils were evaluated at 4 g/$ft^2$, 7 g/$ft^2$, and 10 g/$ft^2$ loadings. Included in the test was a blend of seven untempered MDF control panels provided by Temple-Inland-Clarion, Pa. These panels were 24×24-inch and 7⁄32-inch thick, cut into nine squares, each of 7¾ inches. One square from each 24×24-inch panel was included in each of the seven experimental blends. The remaining three squares from each panel were randomly distributed among the various blends.

In order to apply tempering oil to surfaces of the individual squares, each blend was placed on a balance while arranged into a larger square. Prior to tempering, the surfaces of the MDF squares were wiped with a tack cloth to remove dust and weighed in a dry form. Tempering oil was applied to both surfaces of the MDF using a hand held airless sprayer until the sprayed weight of the panels indicated the desired loading. The surface temperature of the MDF was approximately 70° F. at the time when the tempering oil was applied.

Next, the panels were stored at 70° F. for 96-hours for curing the tempering oil before an evaluation for surface water resistance by a cobb-ring test and for film strength by a tape-pull test.

Results and Discussion

The tape-pull test results for the tempered MDF squares were superior to tape-pulls from the untempered MDF control panel. The tape-pull from the control panels removed large amounts of wood fiber. Evaluation of tape-pull from the inventive tempered blends of squares showed no significant wood fiber removal from the panel surfaces. The tape-pull results from the surfaces tempered with both scientific double boiled linseed oil and GP1125-Mn linseed oil at the 4, 7, and 10 g/ft$^2$ loading did not visually appear to have any significant difference.

The MDF squares tempered with either of these two oils exhibited surface water resistance properties that were superior to the water resistance property of the control panel, which had a water absorption of 9.5%. The surfaces tempered with the scientific double boiled oil provided the best water resistance.

At a loading of 10 g/ft$^2$, the water absorption of the MDF squares tempered with the scientific double boiled oil was 4.3%, which is less than half the water absorption of the control panel. As the surface loading of the scientific double boiled tempering oil was reduced, the water absorption increased. However, even with as little as 4 g/ft$^2$ of the scientific double boiled oil, the water absorption remained much less than the water absorption of the control panel and also less than the water absorption of the GP1125-Mn oil at 10 g/ft$^2$.

The water absorption of the MDF panels tempered with GP1125-Mn at a loading of 10 g/ft$^2$ was 6.6%. Similar to the results with the scientific double boiled oil, water absorption for GP1125-Mn increased with a decreasing of the loading, but the absorption for CP1125-Mn remained less than that of the control panel.

The results of the MDF panels tempered with GP1125-Mn displayed large standard deviations. These large deviations may be attributed to the Mn dryer settling out of the oil during the tempering process. During the procedure, tests with the 10 g/ft$^2$ tempered MDF panels were completed first, followed immediately by tests with the 7 g/ft$^2$ and 4 g/ft$^2$ loadings. The standard deviation gradually increased with MDF panels which were tempered later in the procedure.

Conclusion

Both the water resistance and the surface integrity of the MDF panels benefited significantly from the application of either the scientific double boiled oil or the GP1125 oil, each mixed with small amounts of a high solids manganese dryer. Tempering oil loadings as low as 4 g/ft$^2$ provided large improvements in water resistance and tape-pull test results, with no significant fiber pull. As the oil loading increased, the MDF surface water resistance was further improved.

Both the scientific double boiled and GP1125-Mn oils can be incorporated into most standard MDF production processes with a minimal capital investment and without any substantial modification to the manufacturing process.

TABLE 4

Surface water resistance by cobb-ring test method conducted on untempered MDF panels and tempered with Scientific Double Boiled and GP1125 with 0.15% Mn at loadings of 4, 7 and 10 g/ft$^2$.

| Control | Tempering Oil Loading | | Density (pcf) | Absorption (grams) | Absorption (percent) |
|---|---|---|---|---|---|
| | no oil | mean | 51.7 | 16.9 | 9.5 |
| | | s.d. | 1.8 | 3.7 | 2.4 |
| Scientific | 10 g/ft$^2$ | mean | 52.5 | 8.1 | 4.3 |
| Double | | s.d | 1.6 | 0.7 | 0.5 |
| Boiled | 7 g/ft$^2$ | mean | 52.0 | 8.5 | 4.6 |
| | | s.d. | 1.8 | 0.7 | 0.5 |
| | 4 g/ft$^2$ | mean | 52.3 | 9.9 | 5.4 |
| | | s.d | 1.8 | 0.5 | 0.3 |
| GP1125 with | 10 g/ft$^2$ | mean | 51.4 | 12.0 | 6.6 |
| 0.15% Mn | | s.d. | 2.7 | 4.7 | 2.7 |
| | 7 g/ft$^2$ | mean | 51.6 | 13.0 | 7.3 |
| | | s.d. | 2.2 | 8.2 | 5.3 |
| | 4 g/ft$^2$ | mean | 51.1 | 14.7 | 8.2 |
| | | s.d | 2.3 | 11.9 | 7.0 |

EXAMPLE 4

Methods and Material

Several 4-inch by 12-inch doorskin panel samples of were provided by Masonite's Towanda, Pa. mill. OMG Chemicals supplied the 40% solids Mn dryer, having the manufacturer product code FOA #910. The amount of added dryer was based on liquid weight of oil.

To improve upon cold cure tempering several additives were evaluated in combination with linseed oil. The additives evaluated and a description of what they are follows:

| Blend | Additive[1] | Tempering Oil |
|---|---|---|
| (iv) | Alinco Y | Bodied linseed oil |
| (v) | Alinco Z2 | Bodied linseed oil |
| (vi) | Beckosol 10-539 | Alkyd modified oxidizing oil |
| (vii) | Drisoy-Z | Modified soybean oil |
| (viii) | Esskol-Z | Modified linseed oil |
| (ix) | Kellin Z2 | Modified linseed oil |
| (x) | Kelsol 3937-WG4-45 | Phenolic modified linseed oil |
| (xi) | ML 189 | DCPD modified linseed oil |
| (xii) | Mondur MRS-4 | Low molecular weight MDI (Imw-MDI) |

[1]With the exception of the Blend (xii) MDI, additives were combined at a ⅓ ratio with GP1125 refined linseed oil catalyzed with 0.15% FOA #910.

Initial cold tempering experiments with 5% Imw-MDI (Blend (xii)) in linseed oil exhibited good film strength and water resistance. To increase cleavage test values from the Imw-MDI tempered doorskin panels, the loading was increased to 10%.

The laboratory tempering technique involved preheating the doorskin panel samples to 380° F. to emulate out of press panel conditions. Immediately after being removed from the heat, the pieces were placed adjacent each other on a balance to weigh them in an untreated condition. While on the balance, tempering oil was applied to both sides of the pieces using a hand held airless sprayer. Oil was applied at a loading of 1.5 grams/ft$^2$ on the front surface of the sample and 4.5 grams/ft$^2$ on the back surface. The loading was determined by comparing the weight of the panels before and after the spraying. The spray-coated panels were then hot-stacked and stored at 70° F. for 24-hours before being cut into test samples. An additional 24-hours was allowed before cobb-ring and tape-pull testing.

Results and Discussion

The samples that were tempered with Alinco Z (Blend (iv)), Esskol (Blend (viii)), Kelsol (Blend (x)), ML189 (Blend (xi)), and Imw-MDI (Blend (xii)) yielded acceptable front and back surface tape-pulls with a minimal amount of fiber removed. The Alinco Y (Blend (iv)), Beckosol (Blend (vi)), Drisoy (Blend (vii)), and Kellin (Blend (ix)) exhibited poor tape-pull results.

Cobb-ring tests showed that the Imw-MDI (Blend (xii)) samples at 3.5% had the lowest water absorption. The ML189 (Blend (xi)) and Alinco Y (Blend ((iv)) exhibited water absorption values at approximately 5%. The Esskol (Blend (viii)) water absorption was at 5.7%. The Alinco Z (Blend (iv)), Drisoy (Blend (vii)), and Kelsol (Blend (x)) exhibited water absorption values that were at or above 6%. Water absorption of the Beckosol (Blend (vi)) and Kellin (Blend (ix)) samples had two to four times more water absorption than the other blends had.

The ML189 (Blend (xi)) tempered panels exhibited the greatest cleavage strengths at 44.9 pounds, followed by the Esskol (Blend (viii)) samples at 42.4 pounds. Each of the Beckosol (Blend (vi)), Drisoy (Blend (vii)), Kellin (Blend (ix)) and Imw-MDI (Blend (xii)) samples exhibited a cleavage strength above 35 pounds. The cleavage strengths of the Alinco Y (Blend (iv)), and Kellin (Blend (ix)) were at or below 30 pounds.

Conclusion

The Esskol (Blend (viii)), ML189 (Blend (xi)) and Imw-MDI (Blend (xii)) tempered doorskin panels exhibited the most suitable combination of film strength, water resistance, and glueability. The Alinco Y (Blend (iv)), Alinco Z (Blend (v)), Beckosol (Blend (vi)), Drisoy (Blend (vii)), Kellin (Blend (ix)) and Kelsol (Blend (x)) tempered doorskin panels were lacking in one or more of the three categories.

TABLE 5

Tempered doorskin to door frame glueability obtained by cleavage test method. Cleavage test results are ranked from highest to lowest strength. Italic text indicates suitable tape-pull results.

| | | Density (pcf) | Cleavage (pounds) |
|---|---|---|---|
| ML189 (Blend xviii) | mean | 61.5 | 44.9 |
| | s.d. | 1.7 | 7.6 |
| Esskol (Blend xv) | mean | 62.5 | 42.4 |
| | s.d. | 2.4 | 6.1 |
| Beckosol (Blend xiii) | mean | 58.9 | 39.7 |
| | s.d. | 1.2 | 7.5 |
| Mondur-4, Imw-MDI | mean | 64.4 | 37.9 |
| (Blend iii) | s.d. | 1.6 | 7.2 |
| Kellin | mean | 61.3 | 37.4 |
| | s.d. | 1.3 | 10.2 |
| Drisoy (Blend xiv) | mean | 61.4 | 36.1 |
| | s.d. | 2.0 | 9.9 |
| Alinco Z (Blend xii) | mean | 61.9 | 30.7 |
| | s.d. | 1.7 | 6.4 |
| Alinco Y (Blend xi) | mean | 63.0 | 28.4 |
| | s.d. | 2.0 | 2.9 |
| Kelsol | mean | 62.4 | 27.1 |
| | s.d. | 2.6 | 4.0 |

Note:
pcf - pounds per cubic foot
s.d. - standard deviation

TABLE 6

Water absorption through tempered doorskin surface obtained by 2-inch cobb-ring test method. Combinations are ranked from lowest water absorption to highest. Italic test indicates suitable tape-pull results.

| | | | Absorption | |
|---|---|---|---|---|
| | | Density (pcf) | Grams | Percent |
| Mondur-4, Imw-MDI (Blend | mean | 64.6 | 1.1 | 3.5 |
| XIII) | s.d. | 0.7 | 0.3 | 0.9 |
| ML189 (Blend xviii) | mean | 63.5 | 1.5 | 4.9 |
| | s.d. | 2.2 | 0.5 | 1.8 |
| Alinco Y (Blend xi) | mean | 63.4 | 1.6 | 5.3 |
| | s.d. | 2.5 | 0.2 | 0.8 |
| Esskol (Blend xv) | mean | 63.5 | 1.7 | 5.7 |
| | s.d. | 0.8 | 0.8 | 2.7 |
| Alinco Z (Blend xii) | mean | 66.1 | 1.8 | 6.0 |
| | s.d. | 1.7 | 0.5 | 1.8 |
| Drysoy (Blend xiv) | mean | 62.3 | 1.9 | 6.2 |
| | s.d. | 1.8 | 1.2 | 4.0 |
| Kelsol (Blend xiii) | mean | 63.9 | 2.3 | 7.3 |
| | s.d. | 1.7 | 0.3 | 1.0 |
| Beckosol (Blend xiii) | mean | 61.0 | 3.0 | 10.1 |
| | s.d. | 0.9 | 1.1 | 3.9 |
| Kellin (Blend xvi) | mean | 62.9 | 3.6 | 11.6 |
| | s.d. | 2.5 | 1.5 | 4.6 |

Note:
pcf - pounds per cubic foot
s.d. - standard deviation

EXAMPLE 5

In an effort to reduce VOCs and HAPs during composite panel manufacture, the inventor evaluated several formulations of linseed oil based tempering agents that cure without the aid of a bake oven. A fast cure with minimal emissions is the requirement for such specialty tempering oils. For this requirement, a linseed oil that is catalyzed or blended with additives has been evaluated.

During mill production, manufacturing delays and complications may require that doorskin panels be tempered at temperatures which are lower than their out of the press temperature. Therefore, the doorskin panels were evaluated with tempering oil applied at about 125° F., 175° F. and 300° F.

Methods and Material

Several additives were evaluated in combination with linseed oil, as follows:

| Blend | Additive | Tempering Oil |
|---|---|---|
| viii | Esskol Y-Z | Modified linseed oil |
| xi | ML189 | DCPD modified linseed oil |
| xii | Mondur MRS-4 | Low molecular weight MDI (Imw-MDI) |

With the exception of the Imw-MDI (Blend xii), the additives were combined at a 1/3 ratio with GP1125 refined linseed oil catalyzed with 0.15% Mn, having a manufacturer's designation of FOA #910. Several 4-inch by 12-inch panel samples of doorskins were provided by Masonite's Towanda, Pa. mill. OMG Chemicals supplied the 40% solids Mn dryer, FOA #910. The amount of the dryer addition was based on the liquid weight of the oil.

The doorskin panel samples were preheated to each of the temperatures 125° F., 175° F. and 300° F. in order to simulate various mill tempering conditions. Immediately after being removed from the heat the pieces were placed adjacent each other on a balance and weighed in an untreated condition. While on the balance, tempering oil was applied to both sides of the pieces using a hand held airless sprayer. Oil was applied at a loading of 1.5 grams/ft$^2$ on the front of the sample and 4.5 grams/ft$^2$ on the back, as indicated by panel weight before and after spraying. The spray-coated panels were then hot stacked and stored at 70° F. for 24-hours before being cut into test samples. An additional 24-hours were allowed before back surface cobb-ring and cleavage testing. Tape-pull tests were conducted on both the front and back surfaces.

Results and Discussion

Tape-pull tests conducted on the Esskol (Blend viii) tempered panel samples at each of the temperatures 125° F., 175° F. and 300° F. had little to no fiber-pull from either the front or back surfaces. The ML189 (Blend xi) tempered panel samples also exhibited excellent fiber-pull results at each of the test temperatures.

The 125° F. Imw-MDI (Blend III) panel samples exhibited good tape-pull results. However, the panel samples had an oily feel to the touch and the tape had poor adhesion to the panel samples. Panel samples tempered at 175° also had a slightly oily feel, but the tape was able to adhere to the samples. At 300° F., the Imw-MDI (Blend III) tempered panel samples did not feel oily and tape adhesion was not an issue, but the tape-pull tests were still poor at all three test temperatures.

The cure temperature of MDI resins is approximately 190° F., but it can be lower in the presence of moisture. Prior to the tempering oil application, panel samples were heated by direct contact so that there was a minimal amount of moisture present in the pieces. At lower temperatures, the Imw-MDI (Blend iii) and oil mix may not have cured completely by the time of the testing.

The water resistance of the tempered surface was determined by a cobb-ring test. At 125° F., the Imw-MDI (Blend iii) tempered panel samples exhibited significantly ($p<0.05$) less water absorption that the Esskol (Blend viii) and ML189 (Blend xi) panel samples tempered at the same temperature. A comparison of the 125° Esskol and ML189 water absorption results did not show a significant difference.

Cobb-ring test results from samples tempered at 175° F. yielded similar results. The Imw-MDI (Blend iii) panel samples exhibited significantly ($p<0.05$) less water absorption than the Esskol (Blend viii) and ML189 (Blend xi) tempered panel samples. At 175° F., cobb-ring test results of the Esskol and ML189 tempered samples were not significantly different.

At 300° F., the Imw-MDI (Blend iii) panel samples exhibited significantly ($p<0.05$) less water absorption than the ML189 (Blend xi) panel samples, but not the Esskol (Blend viii). At 300° F., cobb-ring results of the Esskol and ML189 tempered panel samples were not significantly different. As the temperature increased, the water absorption of the Imw-MDI and ML189 tempered panel samples remained constant. Between 125° F. and 175° F., the Esskol panel sample's water absorption results remained constant. However, at 300° F., the Esskol panel sample's water absorption decreased slightly.

At the three test temperatures, the ML189 (Blend xi) panel samples exhibited cobb-ring values similar to the values of mill production control panel samples. The Esskol Blend (xi) control panel samples tempered at 125° F. and 175° F. also had cobb-ring values similar to the values of the mill production control samples. Cobb-ring values from the 300° F. test of the Esskol (Blend viii) panel samples were less than the values of the mill production control panel samples. Samples tempered at an independent laboratory yielded cobb-ring values which were less than the corresponding values of the Esskol, ML189 and the mill production control panel samples. At all three test temperatures, the Imw-MDI (Blend iii) samples had lower cobb-ring values than either the mill production control panel samples and the independent laboratory samples.

At 125° F., the cleavage test from Esskol (Blend viii) panel samples was significantly ($p<0.05$) greater than the test of the Imw-MDI (Blend iii) samples, but not the ML189 (Blend xi) panel samples. When tempered at 175° F., there was no significant difference in cleavage strength among these three oils. At 300° F., the cleavage test results from Esskol panel samples were significantly ($p<0.05$) greater than the Imw-MDI panel samples, but not the ML189 panel samples.

The cleavage strengths of the mill production control panels and the independent laboratory tempered panels were two or three times the cleavage strengths of the Esskol (Blend viii), ML189 (Blend xi) and Imw-MDI (Blend iii) samples. In the previous non-bake experiments, doorskin panel samples were tempered at 380° F. The cleavage strengths for the Esskol, ML189 and Imw-MDI samples were 44.9 pounds, 42.4 pounds and 37.9 pounds, respectively.

Conclusion

Among the three non-bake combinations, the manganese catalyzed Esskol/GP1125 exhibited the greatest cleavage strengths and tape-pull results. The water resistance of the Esskol alone (Blend viii) blend was comparable to results from the other non-bake oils and also from the mill production control panels. The results from manganese catalyzed ML189/GP1125 were also favorable, but were slightly less favorable than those of the Esskol blend. The performance of these oils was not significantly altered by the temperature variations that occurred during the testing.

The 10% Imw-MDI/GP1125 tempered doorskin panels exhibited the greatest water resistance, but the cleavage strength and tape-pull results were poor. At 125° F. and 175° F., the Imw-MDI (Blend iii) panel samples had an oily feel. The low temperatures were not sufficient to cure the Imw-MDI blend within the 48-hour period before testing.

The Esskol (Blend viii) and ML189 (Blend xi) blends provided water resistance and tape-pull results similar to the corresponding mill production control panel sample and the independent laboratory tempered doorskins. It is difficult to make a comparison of the non-bake oils to the mill production control panel and independent laboratory doorskin panel samples since they were not tempered at the same time.

TABLE 7

Tempered doorskin to door frame glueability obtained by cleavage test method.

| | | | Density (pcf) | Cleavage (pounds) |
|---|---|---|---|---|
| 125° F. | 10% Imw-MDI (Blend iii) | mean | 64.7 | 20.9 |
| | | s.d. | 0.8 | 3.0 |
| | ML189 (Blend xviii) | mean | 64.6 | 28.21 |
| | | s.d. | 1.2 | 6.9 |
| | Esskol (Blend xv) | mean | 65.6 | 33.6 |
| | | s.d. | 1.2 | 7.6 |

TABLE 7-continued

Tempered doorskin to door frame glueability obtained by cleavage test method.

| | | | Density (pcf) | Cleavage (pounds) |
|---|---|---|---|---|
| 175° F. | 10% Imw-MDI (Blend iii) | mean | 65.4 | 22.4 |
| | | s.d. | 1.6 | 5.0 |
| | ML189 (Blend xviii) | mean | 65.3 | 27.2 |
| | | s.d. | 1.0 | 4.9 |
| | Esskol (Blend xv) | mean | 65.2 | 29.9 |
| | | s.d. | 0.8 | 5.9 |
| 300° F. | 10% Imw-MDI (Blend iii) | mean | 63.8 | 20.1 |
| | | s.d. | 2.0 | 4.3 |
| | ML189 (Blend xviii) | mean | 65.4 | 25.8 |
| | | s.d. | 0.9 | 4.3 |
| | Esskol (Blend xv) | mean | 65.3 | 27.3 |
| | | s.d. | 1.2 | 4.1 |
| | Mill Production | mean | 61.6 | 66.5 |
| | Control Panel | s.d. | 1.7 | 8.2 |
| | Independent Lab | mean | 64.1 | 75.4 |
| | Tempered | s.d. | 2.7 | 14.6 |

Note:
pcf - pounds per cubic foot
s.d. - standard deviation

TABLE 8

Water absorption through tempered doorskin surface obtained by 2-inch cobb-ring testing method.

| | | | Density | Absorption | |
|---|---|---|---|---|---|
| | | | (pcf) | Grams | Percent |
| 125° F. | 10% Imw-MDI (Blend iii) | mean | 65.4 | 0.9 | 2.8 |
| | | s.d. | 1.0 | 0.2 | 0.6 |
| | ML189 (Blend xviii) | mean | 63.4 | 2.4 | 7.7 |
| | | s.d. | 2.1 | 0.6 | 1.9 |
| | Esskol (Blend xv) | mean | 66.0 | 2.3 | 7.2 |
| | | s.d. | 1.7 | 0.9 | 3.0 |
| 175° F. | 10% Imw-MDI (Blend iii) | mean | 62.5 | 1.1 | 3.6 |
| | | s.d. | 1.2 | 0.8 | 2.6 |
| | ML189 (Blend xviii) | mean | 64.1 | 2.6 | 8.1 |
| | | s.d. | 1.0 | 0.2 | 0.8 |
| | Esskol (Blend xv) | mean | 64.9 | 2.2 | 7.1 |
| | | s.d. | 1.5 | 1.2 | 3.9 |
| 300° F. | 10% Imw-MDI (Blend iii) | mean | 64.1 | 0.6 | 2.1 |
| | | s.d. | 1.1 | 0.1 | 0.2 |
| | ML189 (Blend xviii) | mean | 64.1 | 2.6 | 8.4 |
| | | s.d. | 1.1 | 0.5 | 1.6 |
| | Esskol (Blend xv) | mean | 63.9 | 1.9 | 5.9 |
| | | s.d. | 1.0 | 1.2 | 3.7 |
| | Mill Production | mean | 61.2 | 2.3 | 7.4 |
| | Control Panel | s.d. | 1.5 | 0.2 | 0.7 |
| | Independent Lab | mean | 65.4 | 1.5 | 4.7 |
| | Tempered | s.d. | 1.2 | 0.2 | 0.4 |

Note:
pcf - pounds per cubic foot
s.d. - standard deviation

EXAMPLE 6

Methods and Materials

Three linseed oil based tempering agents were evaluated in this test. GP1125 linseed oil was selected as a base because it is refined to minimize low molecular weight compounds that have a potential to flash off at high temperatures. "Archer 1" linseed based oil has been refined and modified for a higher rate of conjugation, thus enabling a faster cure and tougher film.

The oil combinations evaluated are listed below.

GP1125 (Blend i) with 0.15% manganese (Mn) dryer

70/30 mix of GP1125 and Archer 1 conjugated drying oil with 0.15% Mn dryer (Blend ii)

GP1125 (Blend iii) with 5.0% low molecular weight isocyanate resin (Imw-MDI)

Several 4-inch by 12-inch doorskin panel samples of were provide by Masonite at the Towanda, Pa. mill. A 40% solids Mn dryer, FOA#910, was supplied by OMG Chemicals. The amount of added dryer was based on the liquid weight of oil.

The tempering testing technique involves preheating the doorskin panel samples to 380° F. in order to emulate out of press panel conditions. Immediately after being removed from the heat, the panel samples were placed adjacent to each other on a balance, and weighted before processing. While on the balance, a tempering oil was applied to both sides of the panel sample by using a hand held airless sprayer. Oil was applied at a loading of 1.5 grams/$ft^2$ on the front surface of the sample and 4.5 grams/$ft^2$ on the back surface. The spray coated panels were hot stacked and stored at 70° F. for 24-hours before being cut into test sample panels.. An additional 24-hours was allowed before cobb-ring and tape-pull testing. The tempered panel samples were evaluated for surface integrity by a tape-pull test and for water absorption by a cobb-ring test. Six tape-pulls and twelve cobb-ring tests were conducted for each combination of tempering oils. The tempered panel samples were also evaluated in cleavage testing to determine their ability to bond to door framing materials. Mill tempered control panels were used during data analysis.

Results and Discussion

The panel samples tempered with the experimental oils yielded front surface tape-pulls similar to the tape-pull of the mill tempered control panel. The tape-pulls from the back surface of the ADM oil tempered panels had more fiber pull than the control panel had. However, the differences in the back surface tape pulls were slight and the results could still be considered acceptable.

Cobb-ring testing showed that GP1125 Imw-MDI (Blend iii) tempered samples had the lowest water absorption. Cobb-ring test results from the GP1125-Mn (Blend i) samples and the GP1125/Archer 1 (Blend ii) panels exhibited water resistance properties similar to the resistance properties of the mill tempered control panel.

Cleavage test results from the mill tempered control panel exhibited greater cleavage strength than the strengths of the panels tempered by the three experimental combinations (Blends i–iii). The cleavage strengths of the experimental blends were 11 to 16 pounds lower than the corresponding strength of the control panels. Samples from the GP1125 Imw-MDI (Blend iii) exhibited a higher incidence of failure at the glue line than did the other experimental and control blends.

Conclusion

The experimental tempering oil combinations exhibited satisfactory tape-pull results and water resistance properties that were similar to or above the corresponding properties of the mill tempered doorskin control panels. The cleavage strengths of the experimental blends were not as great as the cleavage strengths obtained from the mill tempered doorskin control panels.

During initial experiments, a loading of 6 g/ft2 of the experimental tempering oils was applied to both the front and back of the doorskin sample panels. At higher loadings, the tape-pull test results were similar to, and the water resistance was superior to, those of the mill tempered panel samples. The cleavage strength of the doorskin tempered panels with the non-bake oil may also be improved with increased oil application.

Various modifications will occur to those skilled in the art. Therefore, the appended claims are to be construed to include all equivalents that are within the scope and spirit of the invention.

The claimed invention is:

1. A method of tempering a composite fiber panel, said method comprising the steps of:

(a) preparing a tempering oil comprising a mixture of drying oil and a dryer selected from a group consisting of a catalyst, modified oil, and resin;

(b) forming composite panels from a mixture of fiber and a bonding material processed in a hot press;

(c) spraying the tempering oil of step (a) on at least one side of said composite panels while they are still hot from the press in step (b); and (d) placing the panels sprayed in step (c) in a stack while they are still hot and maintaining said stack at an ambient temperature for a predetermined period of time.

2. The method of claim 1 wherein the stack of step (d) is maintained in a cure chamber, wherein heat in the cure chamber is established by residual heat in said panels resulting from said hot press.

3. The method of claim 1 wherein the tempering oil of step (a) is selected from a blend consisting of: (i) a linseed oil mixed with a dryer, said linseed oil being refined to minimize low molecular weight; (ii) a linseed oil refined to minimize low molecular weight mixed with a conjugated drying oil, said linseed oil and conjugated drying oil being then mixed with a dryer; and (iii) a linseed oil refined to minimize low molecular weight mixed with a low molecular weight isocyanate resin.

4. The method of claim 3 wherein the dryer of blends (i) and (ii) is manganese.

5. The method of claim 3 wherein said dryer is present in an amount in the range of about 0.05–0.15% of the liquid weight of the oil.

6. The method of claim 5 wherein the dryer is manganese.

7. The method of claim 6 wherein the linseed oil of step (a) blend (ii) is present in an amount of about 70% wt. and the conjugated oil is present in an amount of about 40% wt. of the total mixture of oil, and said manganese is present in an amount of about 0.15% of the liquid measured by the weight of the drying oil.

8. The method of claim 1 wherein the panel is selected from a group consisting of hardboard, oriented strand board, fiber board siding, wafer board, medium density fiber board, particle board, and doorskin.

9. The method of claim 1 wherein the temperature of the hot panels of step (c) is selected from a group consisting of about 125° F., 175° F., 300° F. and 380° F.

10. The method of claim 1 wherein the sprayed oil of step (c) is applied at a loading in the range of about 1–10 gram/ft$^2$ on a surface of said panel.

11. The method of claim 1 wherein said panels stacked in step (d) are stacked in face-to-face contact and are left in said stack for a period of about 10–72 hours.

12. The method of claim 1 wherein said fiber of step (b) is an agriculture fiber.

13. The method of claim 1 wherein said fiber of step (b) is a wood fiber.

14. The method of claim 1 wherein the drying oil of step (a) is selected from a group consisting of linseed oil, soy bean oil, canola oil, sunflower oil, tung oil, and mixtures thereof.

15. The method of claim 14 and the further step of mixing the selected drying oil with a metal catalyst selected from a group consisting of manganese, cobalt, iron, zirconium, and rare earth.

16. The method of claim 14 and the further step of mixing the selected drying oil of step (a) with a material selected from a group consisting of a resin, modified resin, isocyanate resin, phenolformaydehyde resin, ureaformaldehyde resin, and blends thereof.

17. The method of claim 14 and further step of mixing the selected drying oil of step (a) with an organic peroxide which adds oxygen to the oil.

18. The method of claim 17 wherein the organic peroxide is methyl ethyl ketone peroxide.

19. A method of making a composite panel with a tempered surface, said method comprising the steps of:

(a) assembling fibers and binder materials into a mixture;

(b) distributing and spreading said mixture of fibers and binder in a hot press for a predetermined period of time to form a composite panel from said mixture, whereby said panel is hot when removed from said press;

(c) forming a tempered oil selected from a group consisting of linseed oil, a low molecular weight linseed oil, a conjugated linseed oil, soy bean oil, canola oil, sunflower oil, tung oil, and mixtures thereof;

(d) mixing said tempering oil of step (c) with a material selected from a group consisting of manganese, cobalt, iron, zirconium, a rare earth, organic peroxide, and a resin;

(e) applying said tempering oil of step (d) on both side surfaces of said composite panel while it is still hot;

(f) placing a plurality of said sprayed panels of step (e) in a cure chamber at the residual heat of said hot panels, said panels being stored face-to-face in a stack within said cure chamber, and (g) allowing said stacked panels to cure within said cure chamber for a predetermined period of time.

20. The method of claim 19 wherein the tempering oil of steps (c) and (d) is further selected from a blend consisting of: (i) linseed oil mixed with a dryer, said linseed oil being refined to minimize low molecular weight, (ii) linseed oil refined to minimize low molecular weight mixed with a conjugated drying oil, said linseed oil and conjugated drying oil being then mixed with a dryer; and (iii) linseed oil refined to minimize low molecular weight mixed with a low molecular weight isocyanate resin.

21. The method of claim 20 wherein the dryer of blends (i) and (ii) is manganese.

22. The method of claim 21 wherein said dryer of blends (i) and (ii) is manganese in an amount equal to about 0.15% of the liquid weight of the oil.

23. The method of claim 21 wherein the linseed oil of step (c) blend (ii) is present in an amount of about 70% wt., and the conjugated oil is present in an amount of about 40% wt. of the total mixture of oil, and said manganese is present in an amount of about 0.15% of the liquid measured by the weight of the drying oil.

24. The method of claim 21 wherein the manganese dryer of blends (i) and (ii) is about 40% wt. solids.

25. The method of claim 19 wherein the temperature of the hot panels of step (b) is selected from a group consisting of about 125° F., 175° F., 300° F., and 380° F. at the time when the board is removed from said press.

26. The method of claim 19 wherein the sprayed tempering oil is applied at a loading of about 1.5 grams/ft$^2$ on a front surface of said panel and at a loading of about 4.5 grams/ft$^2$ on the back surface of said panel.

27. The method of claim 19 wherein said boards are placed in said face-to-face contact in said curing chamber for a period of about 10–72 hours.

28. The method of one of the claims 1 or 19 wherein the tempering oil is applied in a range of about 1–10 grams/ft$^2$.

* * * * *